May 21, 1968     D. L. PLACKE ET AL     3,384,211

CYCLE CONTROL MECHANISM FOR BUSINESS MACHINES

Filed Dec. 12, 1966     4 Sheets-Sheet 1

FIG. 1

INVENTORS
DALE L. PLACKE &
KENNETH C. FLINT

BY *Louis A. Kline*
*Wilbert Hawk, Jr.*

THEIR ATTORNEYS

INVENTORS
DALE L. PLACKE &
KENNETH C. FLINT

BY *Wilbert Hawk, Jr.*
*Louis A. Kline*

THEIR ATTORNEYS

May 21, 1968     D. L. PLACKE ET AL     3,384,211

CYCLE CONTROL MECHANISM FOR BUSINESS MACHINES

Filed Dec. 12, 1966     4 Sheets-Sheet 4

INVENTORS
DALE L. PLACKE &
KENNETH C. FLINT

BY *Louis A. Kline*
*Wilbert Hawk, Jr.*
THEIR ATTORNEYS

United States Patent Office 3,384,211
Patented May 21, 1968

3,384,211
CYCLE CONTROL MECHANISM FOR BUSINESS MACHINES
Dale L. Placke, Dayton, and Kenneth C. Flint, West Carrollton, Ohio, assignors to The National Cash Register Company, Dayton, Ohio, a corporation of Maryland
Filed Dec. 12, 1966, Ser. No. 601,147
21 Claims. (Cl. 192—33)

ABSTRACT OF THE DISCLOSURE

A mechanism having independently rotatable first and second shaft members of a machine main operating line united in time-spaced single cycle rotations to provide single cycle machine operation of a predetermined cycling time selected between 360 degrees and 720 degrees in duration. A clutch trip mechanism with plural operating controls is preconditioned to connect the second shaft member for single cycle rotation with a rotating clutch shaft upon completion of a precise degree (X or Y) of single cycle rotation of the first shaft member therewith.

---

With business machines at the present time being continually called upon to provide a broader range of complex accounting functions, it is not uncommon to find that various ones of the operational mechanism thereof cannot perform their delegated tasks and/or restore to home within the normal three hundred and sixty degrees time limit allotted for performing a single cycle of machine operation. For this reason, certain types of machine operations having one or more mechanisms falling short of completion within such normal cycling time are customarily performed in a two-cycle (seven hundred and twenty degrees) machine operation. Examples of such multiple-cycle usage are common in the adding machine, accounting machine, and cash register fields, where digit-entering functions are completed during a single cycle of machine operation, while total-taking functions require a two-cycle machine operation. In each instance (sub-total and total), transfer and like mechanisms essential to successful and accurate machine functioning cannot operate completely within the normal single cycle of operation provided (three hundred and sixty degrees); hence necessarily requiring a succeeding like cycle of operation to start immediately and be uninterrupted thereafter.

With this in mind, the instant invention was devised for overcoming the necessity of any such two-cycle machine operation and results in mechanism permitting selection of what is considered a "needed-time" single cycle of machine operation for performing completely and accurately the various digit-entering and total-taking machine functions. In this regard, the normal three hundred and sixty degrees single cycle of machine operation is no longer considered as having controlling effect, and is actually replaced by either one of two new single cycles of machine operation of those degrees in time as determined necessary for completing in each instance the required digit-entering and total-taking functions of the business machine in question. As will become evident from the detailed description of the precise mechanism employed herein, each of such new single cycles of machine operation may be of any degree in time desired between three hundred and sixty degrees and seven hundred and sixty degrees single cycle of machine operation disclosure, and hence in no way being intended as a limitation to the invention, a "short cycle" of three hundred and ninety degrees time duration is planned in the one instance for performing the most complex of digit-entering functions which the business machine might be called upon to perform, with a "long cycle" of five hundred and ten degrees time duration planned in the other instance for performing the most complex of total-taking functions as required of such machine.

In view of the discussion thus far had, it is clear that the primary object of the instant invention is to provide mechanism permitting selection of two distinct single cycles of machine operation, each of "needed-time" in duration between three hundred and sixty degrees and seven hundred and twenty degrees, for performing the various digit-entering and total-taking function requirements of a business machine.

A further object of the invention is to provide such mechanism having safety means insuring machine operation of the precise time period selected in each instance, insuring machine operation completion in each instance, insuring a "mechanism-ready" condition for enabling a different cycle selection at the end of machine operation in each instance, and preventing succeeding cycle selection until machine operation in each instance has progressed sufficiently past its designated functions-completion stage of operation.

With these and incidental objects in view, the instant invention includes certain novel features of construction and combinations of parts, the essential elements of which are set forth in appended claims and a preferred form or embodiment of which is hereinafter described with reference to the drawings which accompany and form a part of this specification.

Framework construction of a machine incorporating the instant invention includes, in the usual and well-known manner, upstanding plate and other mechanism-supporting members secured at various zones on a machine base member or the like. For the present disclosure (FIG. 2), such construction makes use of right and left frame plates 10 and 11, an intermediate frame plate 12, and certain other auxiliary plate members as designated hereafter. The machine main operating line, designated generally herein as main line M, is of split-shaft construction and consists of axially-aligned right and left shaft members M–1 and M–2, the first extending between and journalled within the right frame plate 10 and the intermediate frame plate 12, and the second extending between and journalled within the left frame plate 11 and the intermediate frame plate 12. As illustrated, the innermost end of each shaft M–1 and M–2 is supported by a common bearing 9 carried by the framework intermediate frame plate 12. As per the showing of FIG. 6, it is the combined operation of each of the shafts M–1 and M–2 which makes up the overall cycling time of the machine main operating line M.

Figure 2:
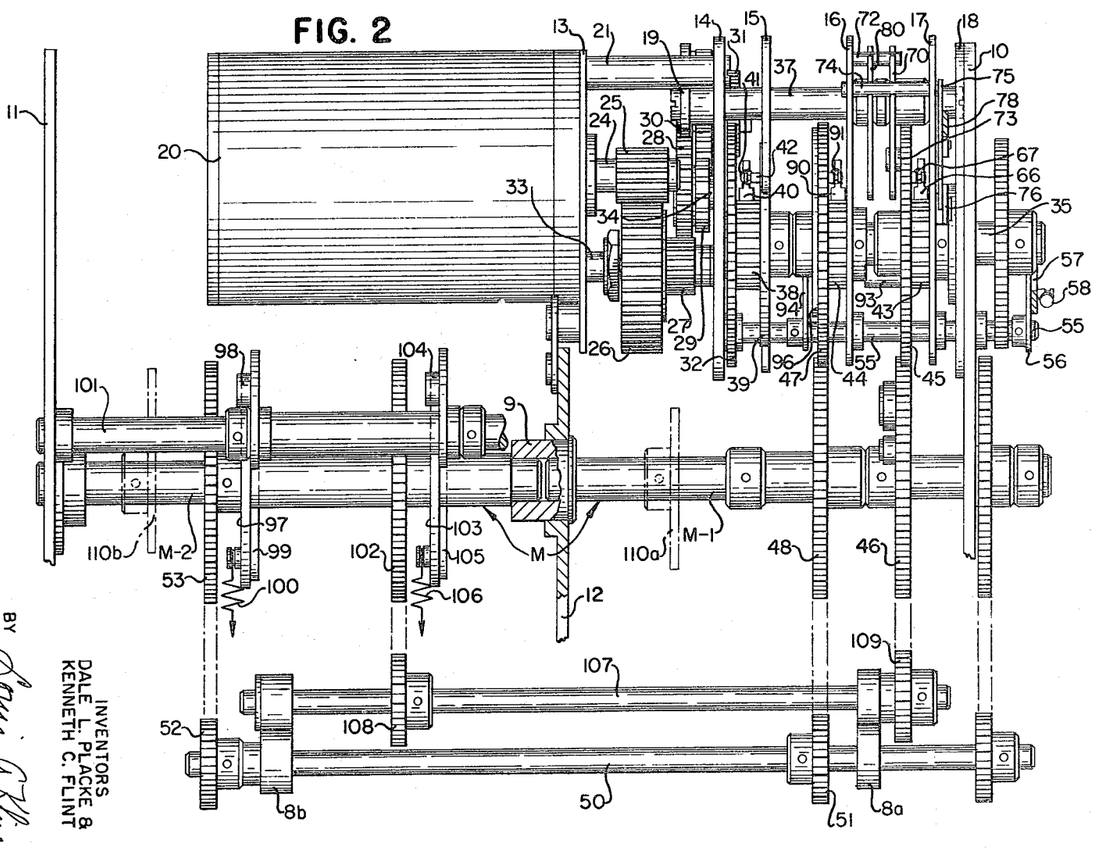
FIG. 2 is a view in top plan of the elements of FIG. 1, as representatively arranged within the confines of a business machine, and including a machine main operating line portion of the invention as operably associated therewith.

Disposed behind the intermediate frame plate 12, so as to be located within the space between the right and left frame plates 10 and 11, is the usual machine motor 20, which provides the necessary drive to the main operating line M for performing the various digit-entering and total-taking functions which the machine in question might be called upon to perform. While the support of the machine motor 20 might take any one of many possible forms, the preferred arrangement is that as best illustrated in FIG. 2, where the forward end of the motor 20 is affixed to a motor support plate 13 appropriately secured to and extending rearwardly from the intermediate frame plate 12 and, by means of an interconnecting stud 21, likewise affixed to an adjacent auxiliary frame plate 14 secured to the base member portion of the machine framework construction. The motor 20 is thus suspended by the support plate 13, which in turn is affixed to the adjacent frame plates 12 and 14. Further or entirely different motor support means may of course be provided if desired.

Additional support plates 15, 16, 17, and 18, provided for supporting the cycle control clutch mechanism, are disposed from left to right in spaced relation one to another between the auxiliary frame plate 14 and the right frame plate 10. As understood from FIG. 2, the rightmost support plate 18 is affixed to the inner side of the machine right frame plate 10, with the remaining said support plates 15, 16, and 17 secured at spaced intervals along lower front and rear tie shafts 22 and 23 extending between the several plates 14 and 18 (see also FIGS. 3, 4, and 5). As understood from FIG. 1, the front tie shaft 22 is appropriately grooved therealong for receipt within a forward notch provided in each of the support plates 15, 16, and 17, while the rear tie shaft 23 is appropriately grooved for accommodating spring clips and the like on each side of a shaft-receiving aperture likewise provided in the plates 15, 16, and 17.

Figure 1:
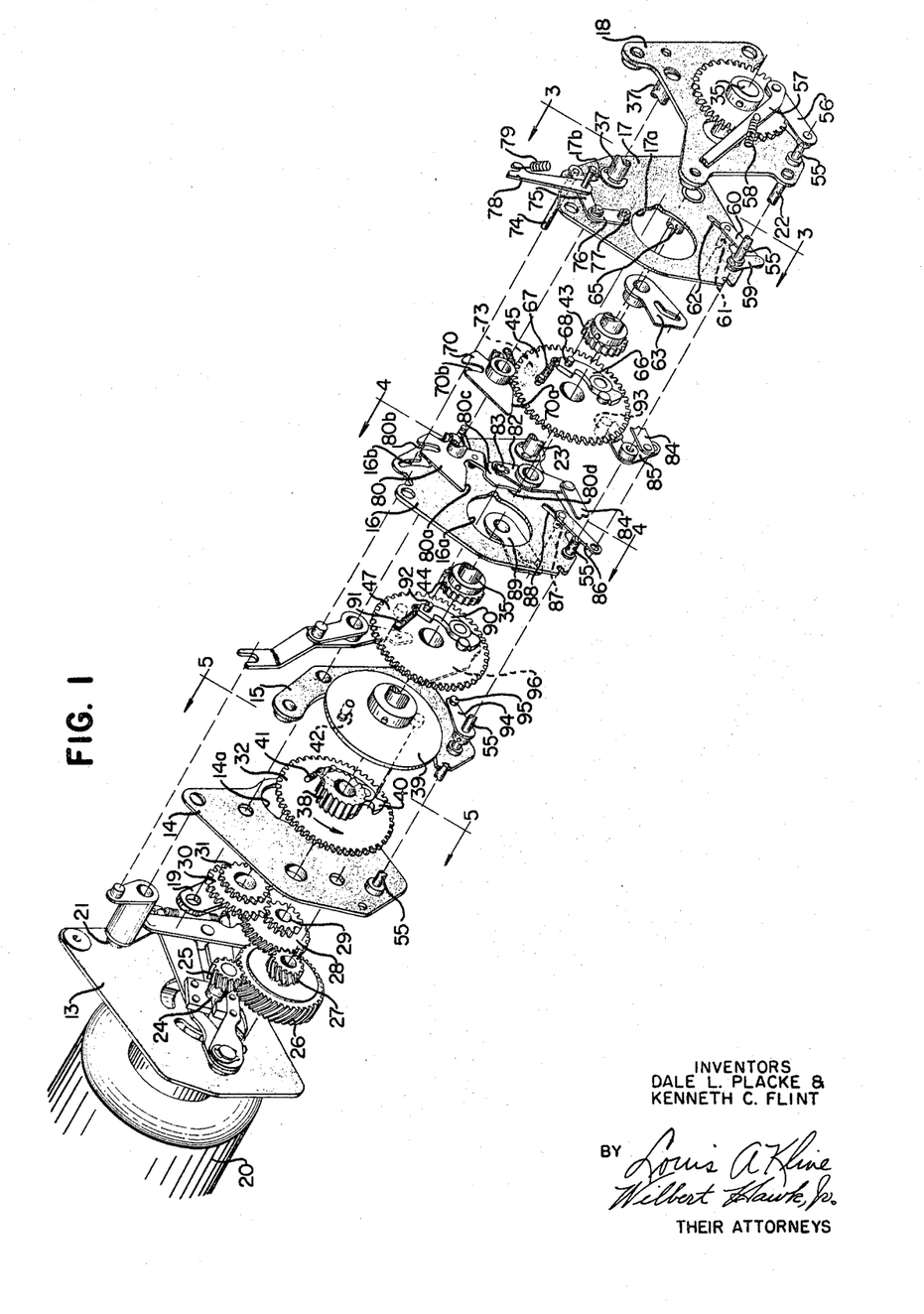
FIG. 1 is a diasassembled perspective view showing in detail the major elements of a cycle control clutch mechanism portion of the instant invention.
Figure 5:
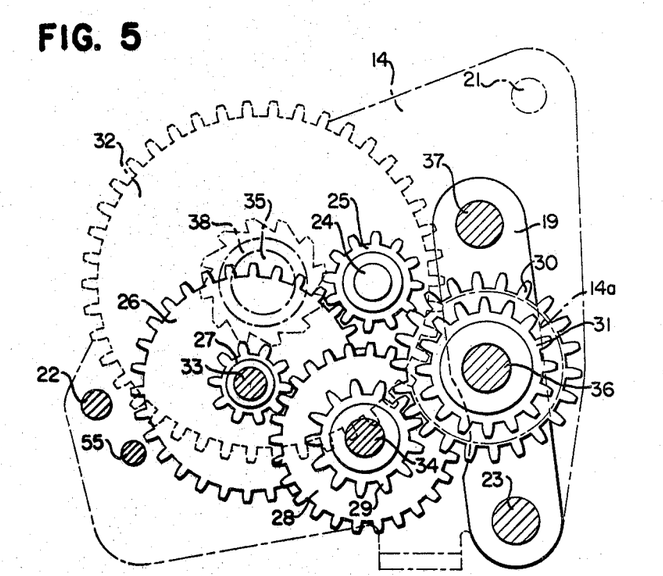
FIG. 5 is a view in section of the instant invention taken along the line 5—5 of FIG. 1.

As illustrated in FIGS. 1, 2, and 5, the motor drive shaft 24, which extends a distance to the right of the support plate 13, carries a pinion 25 intermeshing with an associated gear reduction mechanism provided for driving a machine clutch shaft 35 at a prescribed speed during each energization of the motor 20. Included in such gear reduction mechanism are a large gear 26 meshing with the motor pinion 25, a small gear 27 interconnected with the large gear 26 and meshing with an associated large gear 28, a small gear 29 interconnected therewith and meshing with an associated large gear 30, and a medium gear 31 interconnected with the gear 30 and meshing with an associated clutch shaft drive gear 32. As best understood from FIG. 2, the interconnected gears 26 and 27 are caried by a support shaft 33 extending between the adjacent framework plates 13 and 14, the interconnected gears 28 and 29 are carried by a support stud 34 provided on the frame work plate 14, and the interconnected gears 30 and 31 are carried by a support shaft 36 extending between the framework plate 15 and a framework auxiliary plate 19 affixed a spaced distance leftwardly from the auxiliary frame plate 14. As is clear from FIG. 5, the auxiliary plate 19 has its lower end likewise engaging the framework rear tie shaft 23, with its upper end supported by an upper clutch support shaft 37 extending (FIG. 2) therefrom to and between the framework plates 14 and 18. Other than for the medium gear 31 and its associated clutch shaft drive gear 32, it is seen that the overall gear arrangement making up the instant reduction mechanism is contained within the spacing provided between the several framework plates 13 and 14. As is clear from FIGS. 1 and 2, the drive gear 32, on the other hand, is provided on the opposite side of the framework plate 14, being thereat supported rotatably on the machine clutch shaft 35, which extends between and is journalled within the plate 14 and the companion right-most support plate 18. An aperture 14a (FIGS. 1 and 5) within the frame plate 14 permits free and continued intermeshing of the gear 32 with its associated medium gear 31, such aperture being of a size receiving freely the gear 31 therethrough for disposition likewise on the opposite side of the framework plate 14. The overall gear arrangement thus far described, in being operated by the motor pinion 25, designated to turn counter-clockwise (FIGS. 1 and 5), is seen to be effective for rotating the drive gear 32 on its supporting clutch shaft 35 likewise counter-clockwise and at a prescribed speed as determined by the various gear ratios employed.

Affixed to the outer side of the drive gear 32, so as to extend therefrom toward and somewhat beyond the next adjacent framework support plate 15, is a clutch shaft driving ratchet 38. Adjacent the ratchet 38 is a drive plate 39, affixed to the machine clutch shaft 35 and having thereon a rockable pawl 40 adaptable for operating engagement with the teeth of the associated ratchet 38. A spring 41, stretched between the drive-plate-carried pawl 40 and a drive-plate-carried stud 42 (FIG. 1), yieldingly urges the pawl 40 into a continual driving relationship with respect to the associated ratchet 38. Thus, it is clear, transfers each motor-imparted rotation of the drive gear 32 likewise to its supporting shaft 35. While the effects of this driving interconnection between the gear 32 and the clutch shaft 35 may of course be likewise accomplished by means of direct fixing therebetween, the drive-plate-carried pawl 40 and the drive-gear-carried ratchet 38 are preferred as a convenient arrangement for enabling the disconnection of the machine clutch shaft 35 from the rotational effects of the drive gear 32 should the need ever arise. That is, while not considered essential to the present invention, appropriate interrupter mechanism may be provided for selective disengagement of the pawl 40 from its driving ratchet 38, whereupon the clutch shaft 35 would remain idle throughout or for a precise time period during any further rotation imparted by the motor 20 to the drive gear 32. However, with no such interrupter mechanism being herein present, the ensuing description is based upon regular and uninterrupted counter-clockwise rotation of the machine clutch shaft 35 during each energization of the associated driving motor 20.

Figure 3:
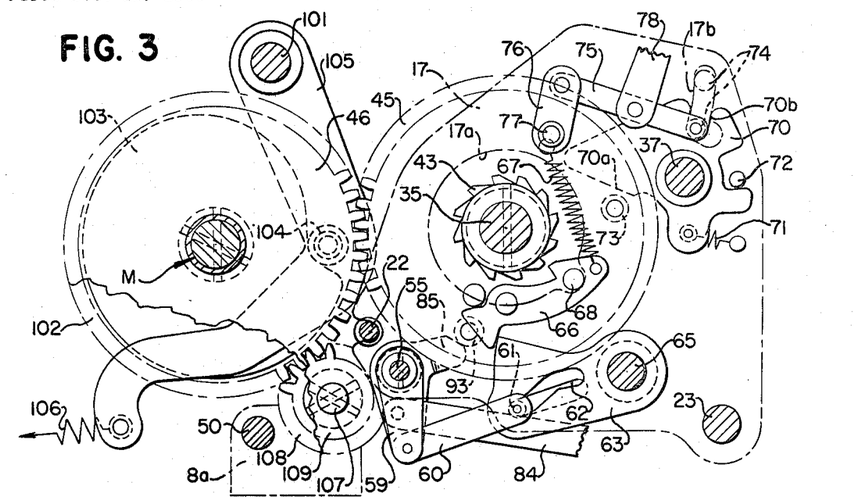
FIG. 3 is a view in section of the instant invention taken along the line 3—3 of FIG. 1, including sectional showing therewith of the associated machine main line portion of the invention as per FIG. 2.
Figure 4:
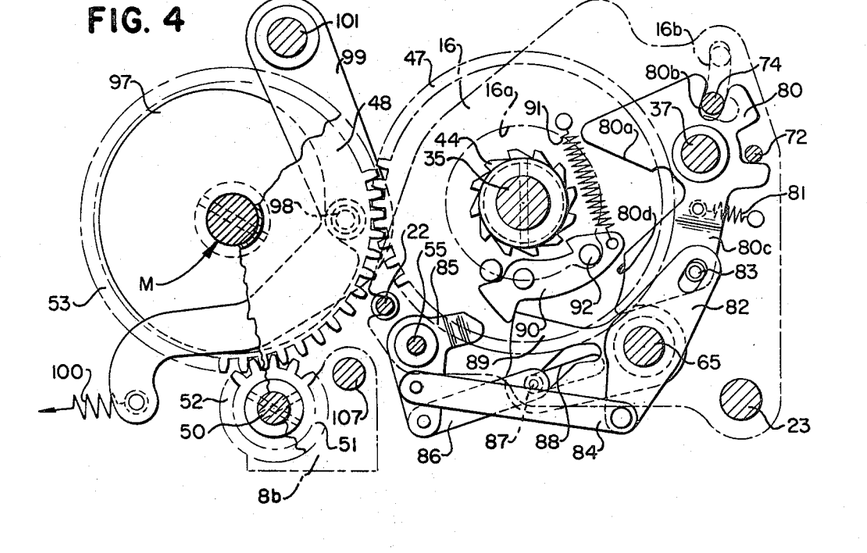
FIG. 4 is a view in section of the instant invention taken along the line 4—4 of FIG. 1, including sectional showing therewith of the associated machine main line portion of the invention as per FIG. 2.

As precisely illustrated in FIG. 1, the support plate 15 is arcuate in shape, so as to permit freedom of placement and operation of the various shaft-35-carried elements. Affixed to and hence rotating with the clutch shaft 35 are two additional ratchet members 43 and 44 (FIG. 1), the first being located adjacent the left side of the support plate 17 and the second being located adjacent the left side of the support plate 16 (FIG. 2). Adjacent the ratchet 43, and mounted for rotation on the clutch shaft 35, is a main line drive gear 45 (FIG. 1), which drive gear 45, as further illustrated in FIGS. 2 and 3, meshes with a companion gear 46 affixed to the right shaft M–1 of the machine main line M. In a like manner, adjacent the ratchet 44 is a rotatably-mounted main line drive gear 47 meshing with a companion gear 48 carried rotatably by the right shaft M–1 (FIGS. 1, 2, and 4). A transfer shaft 50, extending between and journalled within spaced brackets 8a and 8b included in the machine main framework construction (i.e., likewise secured to the machine base member provided), is positioned adjacent the machine main line M (FIG. 4), so as to present a first fixed gear 51 thereof in mesh with the companion gear 48 rotatable on the shaft M–1, and present also a second fixed gear 52 thereof in mesh with a companion gear 53 affixed to the left shaft M–2 of the machine main line M (FIG. 2). It is here noted that the precise positioning of the transfer shaft 50 with respect to the machine main line M is that illustrated in FIG. 4, with the FIG. 2 showing thereof being purposely placed out of position with respect to the main line for convenience and clarity in side-spacing illustration of the various intermeshing gears involved. With the overall construction thus far presented in mind, it is clear that any counter-clockwise rotation imparted to the main line drive gear 45, will through direct movement of the fixed companion gear 46 thereby, impart clockwise rotation of a like degree in movement to the main line right shaft M–1 (FIG. 3). In a like manner, it is clear that any counter-clockwise rotation imparted to the main line drive gear 47 will, through transfer movement thereby of the rotatable companion gear 48, the shaft-50-fixed gears 51 and 52, and the further fixed companion gear 53, impart clockwise rotation of a like degree in movement to the main line left shaft M–2 (FIG. 4).

Extending between and journalled within the several framework plates 14 and 18, at a position slightly below and behind the previously-described front tie shaft 22, is a clutch trip shaft 55. Secured to the right-hand end of the shaft 55 (FIG. 1), so as to be disposed on the outer side of the machine right frame plate 10 (FIG. 2), is a rearwardly extending rocker arm 56 pivotally connected to the lower end of a machine-cycle-initiating link 57. While not illustrated herein, in view of the fact that any convenient arrangement of associated mechanism may be employed, through upward shifting of the link 57 and, hence, through the interconnected arm 56, counter-clockwise rocking of the clutch trip shaft 55 is had whenever the cycle-initiating member of the machine in question, and in the form provided (i.e., motor bar, transaction key, etc.), is caused to be actuated. For purposes of the present disclosure, it may be assumed that the cycle-initiating member so provided for machine operation has releasing control over a latch member operably associated with the upper end of the cycle-initiating link 57 and normally positioned for maintaining such link against automatic upward urgence by way of an interconnected spring 58 (FIG. 1). Direct raising of the link 57 of course may result from associated mechanism if so desired; the requirement essential to a complete understanding of the instant invention being that it is caused to be raised an extent from the position shown in FIG. 1 whenever the cycle-initiating mechanism incorporated in the machine proper becomes actuated to a machine-operating position. While also not illustrated for the reason above noted, simultaneous with each rocking of the clutch trip shaft 55 is mechanism actuated for completing an energizing circuit to the machine motor 20. In this regard, it may be assumed for purposes of the present disclosure that, in addition to imparting counter-clockwise rocking to the trip shaft 55, each upward shifting of the cycle-initiating link 57 actuates, either directly or indirectly, an associated and normally open motor control switch to a closed condition. Thus, it is clear that initiation of each machine operation through the precise link-57-shifting mechanism which may be provided includes both a rocking of the trip shaft 55 and simultaneous energization of the motor 20. Deenergization of the motor 20 will be had automatically upon reaching a precise cycling time during each machine operation, all in the manner more fully discussed later in the specification.

Secured for rocking with the shaft 55, at a zone thereon adjacent the right-hand side of the support plate 17 (FIG. 1), is a clutch trip arm 59 pivotally supporting the front end of an associated link 60 (see also FIG. 3). A stud 61, secured to the other end of the link 60 and slidingly received through an inclined support slot 62 of the plate 17, engages within a cam slot of an associated stop pawl 63, which, in turn, is supported rotatably adjacent the left-hand side of the support plate 17 on a clutch release shaft 65 extending between the several framework plates 17 and 15. The precise positioning of the release shaft 65 is that illustrated in FIG. 3, slightly above and forwardly of the framework rear tie shaft 23. As best understood from FIG. 3, a forward nose portion of the stop pawl 63 normally engages a tail portion of an associated ratchet pawl 66, rockably mounted on the main line drive gear 45 (rotatable on the machine clutch shaft 35), to in turn maintain against the normal urgency of an interconnected spring 67 the ratchet pawl 66 from engagement with the teeth of the ratchet 43 secured to the clutch shaft 35.

Figure 6:
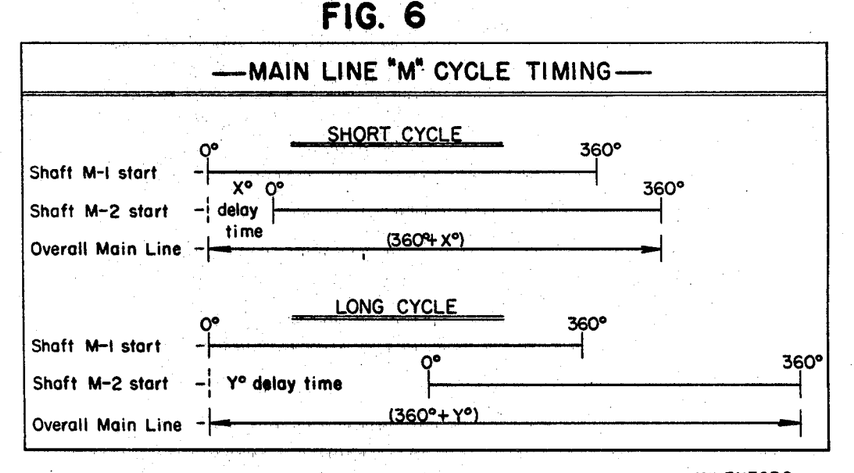
FIG. 6 is a timing chart illustrating the extent of prescribed cycling time of the machine main line portion of the instant invention.

With this overall construction, rocking of the clutch trip shaft 55 will cause the link stud 61 to move rearwardly within its support slot 62 at the time that the machine clutch shaft 35 starts its counter-clockwise rotation under control of the motor 20. Through the cam slot associated therewith, this movement of the stud 61 is effective to rock the stop pawl 63 counter-clockwise an extent which removes its forward nose portion from engagement with the tail portion of the associated ratchet pawl 66, in turn permitting the pawl 66 to be spring-67-urged into driving engagement wih the thence turning ratchet 43. When this happens, the main line drive gear 45 likewise turns counter-clockwise with the machine clutch shaft 35 and, through the intermeshing companion gear 46, is effective for turning the main line right shaft M–1 clockwise therewith. The shaft 35 driving of the gear 45 of course takes place immediately upon the ratchet pawl 66 engaging a tooth of the ratchet 43 when released by the associated stop pawl 63—which, as the shaft-M–1-designated illustration of FIG. 6 illustrates, is the beginning of the overall cycling time of the machine main line M upon either the long or the short cycle selection for machine operation. In a like manner, the length of such driving of the gear 45, and hence the associated shaft M–1, is determined by the time at which the pawl 66 and the ratchet member 43 spring-urged engagement is so maintained. This, as further understood from the illustration of FIG. 6, is for a period of three hundred and sixty degrees cycling time, whereat, through restoring mechanism to be described later, the stop pawl 63 is repositioned effective for disengaging and maintaining the ratchet pawl 66 from driving engagement with the associated ratchet 43. Positive locking of the pawl 66 with the ratchet 43 for such designated cycling time of the main line right shaft M–1 is conveniently provided by means of a pawl-66-carried stud 68 moving there during within a circular opening 17a provided through the framework support plate 17 (FIG. 1), the size of which opening is effective to prevent ratchet pawl removal from driving engagement with the ratchet member other than when positioned at a stud-68-aligned relationship with a pawl-disengaging relief zone defining a home position in the support plate opening 17a. As illustrated in FIG. 3, the pawl stud 68 is received freely within such relief zone of the opening 17a prior to ratchet pawl 66 release by the associated stop pawl 63, and is permitted to return therewithin, when once the pawl 66 is released for driving engagement with the associated ratchet 43, only after a complete rotation (three hundred and sixty degrees) of the machine main line drive gear 45 has taken place.

Rockably mounted on the clutch support shaft 37, at a zone adjacent the left side of the main line drive gear 45 (FIGS. 1 and 2), is a clutch trip plate 70. The precise configuration and normal positioning of the trip plate 70 are best illustrated in FIG. 3, where an interconnected spring 71 urges it counter-clockwise to a position whereat a lower rear extension thereof abuts against a stop stud 72 carried by the machine framework support plate 16. This positioning, as illustrated, presents a forward nose portion 70a of the clutch trip plate 70 within the path of travel of an actuating stud 73 carried by the main line drive gear 45, and likewise presents an upper, U-shaped notch 70b of the plate 70 in alignment for selective receipt of a clutch trip selecting stud 74 therewithin. The selecting stud 74, as further illustrated in FIG. 1, is itself guided for sliding movement within companion L-shaped slots 16b and 17b in the respective framework support plates 16 and 17, with selective upper or lower positioning thereof along the slot vertical leg portion being had under control of the particular machine cycle selecting mechanism as provided.

Like the previously-discussed machine cycle initiating mechanism, the machine cycle selecting mechanism may take any one of many permissible forms; the requirement essential through actuation thereof being that of moving the clutch trip selecting stud 74 to either its upper position (FIG. 1 showing and phantom line stud illustration of FIG. 3) or its lower position (full showing of FIG. 3) along the several guide slots 16b and 17b. For purposes of the present disclosure, such a mechanism makes use of a control link 75 having its rear end affixed to the rightmost end of the selecting stud 74, with its forward end pivotally connected to the upper end of a selecting arm 76 mounted for rocking movement on a plate-17-carried support stud 77. Connected to the control link 75, at an approximate central zone therealong, is an upwardly extending machine cycle selecting link 78, which in turn, by way of an interconnected spring 79 (FIG. 1), is normally urged downwardly for presenting the control-link-carried stud 74 at its lowest position within the associated guide slots 16b and 17b (FIG. 3). Keeping in mind the spring 71 normal positioning of the clutch trip plate 70, it is clear that the present spring 79 positioning of the machine cycle selecting link 78 is effective to present the clutch trip selecting stud 74 normally within the trip plate upper notch 70b (all as illustrated in FIG. 3).

Also mounted for rocking movement on the clutch support shaft 37, at a zone adjacent the right side of the framework support plate 16 (FIGS. 1 and 2), is a second clutch trip plate 80. The precise configuration and normal positioning of the second plate 80 are best illustrated in FIG. 4, where an interconnected spring 81 urges the plate likewise counter-clockwise to a position where a lower rear extension thereof abuts against the stop stud 72—which again presents an upper, U-shaped notch 80b of the plate 80 in alignment for selective receipt of the clutch trip selecting stud 74 therewithin. While the precise configuration of the second clutch trip plate 80 is thus seen to follow generally that of the earlier-described plate 70, the plate 80 includes further a downwardly extending tail portion 80c, which, by means of a stud 83 thereon, pivotally connects the upper end of a clutch trip lever 82 mounted for rocking movement on the clutch release shaft 65. The lower end of the lever 82 pivotally supports a trip link 84 extending forwardly therefrom to pivotally connect with a restoring arm 85, rockably carried by the clutch trip shaft 55 (FIGS. 3 and 4). As understood from FIG. 1, the restoring arm 85 is located adjacent the right-hand side of the framework support plate 16, and itself pivotally supports the front end of an associated link 86 (see also FIG. 4) having a rear stud 87 slidingly received through an inclined support slot 88 of the plate 16 and engaging within a cam slot of an associated stop pawl 89. This stop pawl 89, like the earlier such pawl 63 (FIG. 3), is also rotatably carried by the clutch release shaft 65, but at a zone adjacent the left-hand side of the framework plate 16. As best understood from FIG. 4, a forward nose portion of the stop pawl 89 normally engages a tail portion of an associated ratchet pawl 90 rockably mounted on the main line drive gear 47 (rotatable on the machine clutch shaft 35), to in turn maintain, against the normal urgency of an interconnected spring 91, the ratchet pawl 90 from engagement with the teeth of the earlier-mentioned ratchet 44 secured to the clutch shaft 35. Release of the ratchet pawl 90 for spring-91-urged driving engagement with the associated ratchet 44 will, of course, be had whenever the restoring arm 85 is caused to be rocked counter-clockwise on the clutch trip shaft 55. This, in the manner described previously with respect to operation of the clutch trip arm 59, will cause the stud 87 on the interconnected link 86 to move rearwardly within its support slot 88 to in turn, through the associated cam slot, effect counter-clockwise rocking of the stop pawl 89 sufficient for removing its forward nose portion from holding engagement with the tail portion of the ratchet pawl 90.

With the restoring arm 85 being mounted for rocking movement on the clutch trip shaft 55 (i.e., not pinned thereto), rocking thereof for so releasing the ratchet pawl 90 is under control of the link-84-interconnected clutch trip lever 82, which itself is under control of the stud-83-interconnected second clutch trip plate 80. Hence, while initial rocking of the clutch trip shaft 55, through the fixed trip arm 59, has been effective to connect the main line drive gear 45 for driving engagement with the thence turning machine clutch shaft 35 (all as described above), no such interconnection of the main line drive gear 47 for driving engagement therewith will be had until the second clutch trip plate 80, by one means or another, is caused to be rocked from its FIG. 4, spring-81-urged normal position.

Considering now the several illustrations of FIGS. 3 and 4, and recalling the above-described spring-79-urged positioning of the selecting stud 74 (lower position within the guide slots 16b and 17b), it is understood that the clutch trip plates 70 and 80 are operably interconnected for simultaneous movement. That is, with the stud 74 being at this time received within each of the plate U-shaped notches 70b and 80b, any movement imparted to the clutch trip plate 70 will likewise be had by the second clutch trip plate 80. As described previously, driving of the main line drive gear 45 commences at the approximate time that the machine clutch shaft 35 begins its counter-clockwise movement under control of the machine motor 20. When this happens, the actuating stud 73 thereon moves therewith (counter-clockwise) and into engagement with the forward nose portion 70a of the clutch trip plate 70, in turn overcoming the spring 71 and rocking the plate 70 a precise extent clockwise from its normal position. This, through the permitted arrangement between the control link 75 and the selecting arm 76, carries the clutch trip selecting stud 74 rearwardly and within the horizontal leg portions of the several L-shaped slots 16b and 17b; hence, thereby overcoming the spring 81 and effecting at such time a like rocking movement of the second clutch trip plate 80. When this happens (FIG. 4), the interconnected clutch trip lever 82 is moved counter-clockwise for so rocking the link-84-interconnected restoring arm 85 and therethrough, in the manner described above, releasing the ratchet pawl 90 for spring-91-urged driving engagement with the thence turning ratchet 44. The main line drive gear 47 likewise now turns with the machine clutch shaft 35 and, through the intermeshing companion gear 48, transfer shaft gears 51 and 52, and companion gear 53 arrangement (FIG. 2), is effective for turning the main line left shaft M-2 therewith. Shaft 35 driving of the gear 47 will, of course, take place just as soon as the ratchet pawl 90 moves into engagement with a tooth of the associated ratchet 44. To insure immediacy of such an engagement upon release of the ratchet pawl 90 from the forward nose portion of the stop pawl 89, the clutch trip plate 80 is likewise provided with a lower, forward camming edge 80d for engaging a pawl stud 92 at such time. This arrangement provides trip-plate-80-initiated positive rocking of the ratchet pawl 90 should, for one reason or another, the interconnected spring 91 lag in performing its assigned task. The reason for such supplemental pawl operating means at this time of gear 47 interconnection for driving with the clutch shaft 35 will become apparent from the following description.

With the selecting stud 74 positioned as illustrated in FIGS. 3 and 4 for operably interconnecting the several trip plates 70 and 80, it is axiomatic that the timing at which the plate 80 receives rocking movement for releasing the ratchet pawl 90, and hence cause start of rotation of the main line drive gear 47, will follow by a precise degree in time the start of rotation of the main line drive gear 45; i.e., when the actuating stud 73 thereon moves sufficiently to engage the forward nose portion 70a and thereby operate, in a clockwise direction, the asosciated trip plate 70. When this happens of course depends upon the precise location of the actuating stud 73 on the gear 45, which itself will prescribe, as illustrated by the short cycle representation of FIG. 6, starting of the machine main rotation of the main line right shaft M-1 having already taken place. The period of time for which the gear 47 is driven by the machine clutch shaft 35, and hence the associated main line shaft M-2, is of course determined by the time at which the pawl 90 and the ratchet member 44 are maintained in engagement. This, as further understood from FIG. 6, is for a period of three hundred and sixty degrees cycling time, to in turn provide an overall short cycle of operation of the machine main line M starting with the initial rotation of the right shaft M-1 and ending with completion of rotation of the left shaft M-2. Such a combining of the several shaft member rotational movements is seen to permit the selection of a machine short cycle of operation equalling three hundred and sixty degrees plus the X degrees delay in time prescribed by the selective location of the actuating stud 73 on the machine main line drive gear 45. Stud 73 location will of course in each instance be calculated for providing that degree of machine cycling time considered essential for fulfilling required machine functions. Considering the above-mentioned three hundred and ninety degrees short cycle of machine operation, as representatively selected for purposes of the present disclosure, it is clear that the actuating stud 73 would be so located on the gear 45 for imparting clockwise rocking to the clutch trip plate 70 immediately upon completion of thirty degrees of rotation of the gear 45. This, in the manner described previously, engages the main line left shaft M-2 for operation with the machine clutch shaft 35 precisely at the time the main line right shaft M-1 has completed thirty degrees cycling time, to in combination provide the overall cycling time of three hundred and sixty degrees plus thirty degrees to the machine main line M. Should, for another example, a short cycle of operation of three hundred and seventy-six degrees in time be desired, the actuating stud 73 location would be such as to dictate rocking of the trip plate 70 at a point in time sixteen degrees after the drive plate 45 has begun its rotation. Through the arrangement presented, the time of starting the left shaft M-2 is always calculated from the time of starting the right shaft M-1. Hence, while rotation of the right shaft M-1 for starting each short cycle of machine operation is permitted to commence upon engagement by the spring 67 of the ratchet pawl 66 with its associated ratchet 43 (FIG. 3)—that is, upon first ratchet tooth engagement as attained by the pawl at such time—it is essential to the provision and maintenance of an exact overall cycling time of the machine main line M that rotation of the shart M-2 start precisely at the time the actuating stud 73 so prescribes through its rocking of the trip plate 70. For this reason, the previously-described supplemental rocking means 80d for the ratchet pawl 90 (FIG. 4) is provided to insure associated ratchet member 44 tooth engagement immediately thereby upon release by the stop pawl 89 should the interconected spring 91 ever fail for one reason or another.

Positive locking of the ratchet pawl 90 with the ratchet member 44 when so engaged for the designated three hundred and sixty degrees cycling time of the main line left shaft M-2 is likewise conveniently provided by means of the pawl stud 92 moving within a circular opening 16a in the framework support plate 16 (FIG. 1), the size of which opening prevents disengagement of the ratchet pawl 90 from the ratchet 44 except when the stud 92 is positioned in alignment with a home-position-defining relief zone of the opening. In the manner described previously with respect to FIG. 3, the pawl stud 92 (FIG. 4) is received freely within the relief zone of opening 16a prior to release of the ratchet pawl 90 by the associated stop pawl 89, and is permitted to return again therewithin only after a complete rotation (three hundred and sixty degrees) of the main line drive gear 47 has taken place.

With the construction thus far presented, normal (lower) positioning of the clutch trip selecting stud 74 within its guide slots 16b and 17b provides for a short cycle of machine operation of that time period prescribed by the particular location of the actuating stud 73 on the main line drive gear 45. As described, the drive gear 45 begins to turn approximately simultaneously with initial turning of the machine clutch shaft 35 through energization of the motor 20, to in turn, through the companion gear 46, impart three hundred and sixty degrees rotation to the main line right shaft M-1 (FIGS. 2 and 3). At a precise time during such rotation, through actuating stud 73 rocking of the clutch trip plate 70 and hence, via the selecting stud 74, like rocking of the second clutch trip plate 80, turning of the main line drive gear 47 occurs for, through the companion gear 48, the shaft-50-carried gears 51 and 52, and the companion gear 53, imparting three hundred and sixty degrees rotational movement to the main line left shaft M-2 (FIGS. 2 and 4). As so rotated, the several shafts M-1 and M-2 included in the machine main line M provide for an overall single cycle of machine operation extending beyond three hundred and sixty degrees by any predetermined amount within the range of three hundred and sixty degrees.

While not illustrated herein, in view of the fact that any convenient arrangement of associated mechanism may be employed, upward shifting of the machine cycle selecting link 78 and, hence, raising of the clutch trip selecting stud 74 from its normal, lower, position to its upper position within the several guide slots 16b and 17b are had whenever the cycle selecting mechanism of the machine in question, and in the form provided, is caused to be actuated. For purposes of the present disclosure, it may be assumed that such mechanism is operably connected to a machine-carried transaction key or like member and, when so actuated prior to machine operation by way of the cycle initiating mechanism earlier described, has lifting control over the selecting link 78 for overcoming the spring 79 and raising the selecting stud 74 to its upper position within the guide slots 16b and 17b (phantom line showing of FIGS. 3 and 4). This, it is clear, disconnects the clutch trip plates 70 and 80, one from operation with the other, whereupon actuating stud 73 rocking of the trip plate 70 during drive gear 45 rotation thereafter has no control whatsoever over the trip plate 80, this being in effect an idle movement only against the normal urgency of the spring 71. Release of the ratchet pawl 90 will thus not take place under control of the actuating stud 73 at this time, which stud is of a length to engage only the plate 70 (FIG. 2), but must rely on a further actuating stud 93, carried by the main line drive gear 45 (FIG. 3) and of that length to operate against a forward nose portion 80a of the clutch trip plate 80 itself during rotation of the drive gear 45 (FIGS. 1, 2, and 4). In effect, contrary to the ability of the actuating stud 73 to prescribe the starting time for rotation of the main line left shaft M-2 through indirect rocking of the second clutch trip plate 80 by way of the selecting stud 74 when interconnected with the clutch trip plate 70, the further actuating stud 93 has the ability to prescribe the starting time for rotation of the left shaft M-2 through direct rocking of the trip plate 80 itself whenever, through repositioning of the selecting stud 74, the trip plate 70 is not so interconnected therewith. Simultaneous rocking of both trip plates 70 and 80 will of course take place under control of the longer actuating stud 93, both at this time with the selecting stud 74 at its upper, disconnecting position, and also at the time when the stud 74 is at its lower, connecting position; however, in neither instance does such rocking of the respective plates have any effect whatsoever in controlling the timing of machine cycles of operation. As noted, the rocking of the trip plate 70 at this time (stud 74 in plate disconnecting position) is but an idle movement in any event, whereas rocking of the trip plate 80 a second time during short cycle machine operation (i.e., following earlier indirect rocking thereof by the actuating stud 73) is likewise an idle movement only, release of the ratchet pawl 90 having taken place during trip plate 80 first rocking through the selecting stud 74 when in its plate connecting position. Hence, it is understood that the first rocking of the second clutch trip plate 80 determines the time for starting rotation of the main line left shaft M–2, which will be either through actuating stud 73 for short cycle machine operation or through actuating stud 93 for long cycle machine operation—all as dictated by the positioning of the selecting stud 74 within its guide slots at the time of initiating each machine operation.

As illustrated by the long cycle representation of FIG. 6, the precise location of the further actuating stud 93 on the main line drive gear 45 will prescribe starting of the machine main line left shaft M–2 for rotational movement upon Y degrees rotation of the main line right shaft M–1 having already taken place. Such long cycle of machine operation is again an overall operation of the machine main line M starting with the initial rotation of the right shaft M–1 and ending with the completion of rotation of the left shaft M–2. With this, a further single cycle of machine operation is seen to be made available through compounding of the several shaft movements, but of a longer degree in time as calculated essential for fulfilling certain other operational requirements of the machine in question. As mentioned previously, such a longer cycle of operation might be the case for complete and accurate handling of total-taking functions of business machines and the like. Rather than performing the customary multiple-cycle machine operation for such purpose, an extended single cycle of machine operation of what is calculated to be "needed-time" may now easily be had through selective location of the further actuating stud 93 on the main line drive gear 45. The above example of five hundred and ten degrees assumed to be needed for total-taking purposes would of course have the stud 93 located to rock the second clutch trip plate 80 to a ratchet-pawl-90-releasing position after precisely one hundred and fifty degrees rotation from start of the main line drive gear 45, in turn defining an overall main line M operation equal to three hundred and sixty degrees plus such one hundred and fifty degrees delay in time. Like the previously-discussed short cycle, this long cycle of machine operation may be of any length desired within the confines of three hundred and sixty degrees and seven hundred and twenty degrees, with of course the further restriction of necessarily exceeding in time that of said short cycle of machine operation.

Considering now both the short and long cycles of machine operation hereby permitted, it is clear that when once one or the other is selected through stud 74 upper or lower positioning and machine operation is initiated upon rocking thereafter of the clutch trip shaft 55, further machine operation of either the like or different cycling time must not be started until that selected and in operation has been fully completed. Hence, each succeeding machine operation is subject to completion of an existing operation when once started, whether of the short or long cycle type. To provide for this, locking of the trip shaft 55 occurs shortly after the start of movement of the main line drive gear 47 and continues until the associated main line left shaft M–2 nearly completes its movement. As illustrated in FIG. 1, a trip restraining arm 94 is affixed to the clutch trip shaft 55 at a zone for presenting a roller 95 thereof in operable alignment with an associated cam plate 96 secured to the left-hand surface of the main line drive gear 47 (see also FIG. 2). Through this arrangement, as prescribed by the precise development of the cam plate 96, the previously-operated trip shaft 55 (counter-clockwise by way of upward shifting of the cycle-initiating link 57) is restored clockwise to home after approximately forty degrees cycling time of the drive gear 47 and is effectively retained thereat until approximately three hundred and thirty degrees cycling time of the gear 47 and hence likewise of the operably-interconnected main line left shaft M–2. With the trip shaft 55 first restored and so retained by the cam plate 96, a succeeding machine cycle of operation may of course not be started until near the end of rotation of the shaft M–2—when the shaft 55 is released for further counter-clockwise rocking under control of the particular cycle-initiating mechanism as provided.

Initial restoration to home of the clutch trip shaft 55 at the designated time returns the stop pawl 63 to the position illustrated in FIG. 3, where its forward nose portion is aligned for breaking the driving connection between the ratchet 43 and the ratchet pawl 66 upon completion of precisely three hundred and sixty degrees rotation by the machine main line drive gear 45. This, as illustrated in FIG. 6, defines the stopping time of the main line right shaft M–1 during both short and long cycles of machine operation. Stopping of the main line drive gear 47 will of course not likewise be had at such time, as rotation of the main line left shaft M–2 must continue until its full rotation is also completed. Keeping in mind the rockable mounting of the restoring arm 85 on the clutch trip shaft 55 (FIG. 4), it is axiomatic that the restoring effects of the cam plate 96 will not include the arm 85. Rather than this, clockwise return to home of the arm 85 is had along with spring 81 restoring to home of the second clutch trip plate 80 immediately after it has been actuated in either of the manners described above—through indirect rocking by the actuating stud 73 during short cycle selection and direct rocking by the further actuating stud 93 during long cycle selection. As is clear from FIGS. 3 and 4, actuating stud rocking of the trip plate 80 in either direction is for a limited time only—i.e., throughout stud engagement with the trip plate forward nose portion—and will be returned by the interconnected spring 81 to thereafter immediately present, through return rocking to home of the restoring arm 85, the stop pawl 89 in the position illustrated in FIG. 4, where its forward nose portion is aligned for disconnecting the main line drive gear 47 from driving connection with the machine clutch shaft 35 upon completion of its designated three hundred and sixty degrees rotation. This, as further illustrated in FIG. 6, stops rotation of the main line left shaft M–2 after a like movement during both short and long cycles of machine operation. Should, for one reason or another, the spring 81 fail in its restoration of the trip plate 80, and hence not return to home the restoring arm 85 for repositioning stop pawl 89 effective, it will take place automatically and in a positive manner upon the further actuating stud 93 (FIG. 3) coming around and into direct rocking engagement with a rear nose portion of the arm 85. This insures sufficient rocking of the restoring arm 85 near the end of each drive gear 45 rotation, so as to present the stop pawl 89 effective for terminating drive gear 47 rotation again precisely after completing its designated three hundred and sixty degrees of movement.

Upon being so stopped after completing its full rotational movement, retention of each main line shaft M–1 and M–2 against any further unwanted movement is conveniently had through use of the usual homing mechanism. Affixed for rotation with the companion gear 53, which itself is secured to the main line left shaft M–2 (FIG. 2), is a homing cam 97. As illustrated in FIG. 4, the peripheral edge of the cam 97 cooperates with a roller 98 mounted on a pivoted lever 99, which lever is biased by a strong spring 100 in such a direction as to press the roller 98 against the cam and thereby maintain the left shaft M–2 in its home or starting position, where, as shown, the roller 98 seats itself in a slight depression formed in the periphery of the cam. Through the intermeshing transfer gears 52, 51 and companion gear 48, it is clear that such yieldable holding at home of the shaft M-2 is likewise had by the main line drive gear 47, hence preventing retrograde and other unwanted movement thereof from home. For purposes of the present disclosure, mounting of the pivoted lever 99 is by way of a support shaft 101 extending between the left frame plate 11 and the intermediate frame plate 12 of the machine general framework (FIG. 2). Affixed for rotation with the further companion gear 102 supported by the main line left shaft M-2, but in a rotatable manner (FIG. 2), is a second homing cam 103. Like the cam 97, the second cam 103, as illustrated in FIG. 3, is likewise provided with a peripheral edge cooperating with a roller 104 mounted on a pivoted lever 105 supported by the shaft 101, which lever is biased by a strong spring 106, so as to press the roller 104 against the cam edge and thereby maintain the further companion gear 102 in what might be considered a home, or starting, position. The transfer of such holding of the gear 102 to the main line right shaft M-1 and associated drive gear 45, again for the purpose of overcoming unwanted movement thereof from home, is conveniently arranged through use of a further transfer shaft 107 journaled within the framework brackets 8a and 8b. As illustrated in FIG. 2, affixed to the shaft 107 are transfer gears 108 and 109 intermeshing with the respective companion gears 102 and 46 as provided, which of course, through the fixed gear 46, prescribe the lever 105 positioning of the gear 102 to be likewise had by the main line right shaft M-1. The precise location of such further transfer shaft 107 is that as best understood from FIG. 3, slightly above and behind the earlier shaft 50.

The instant invention is seen to provide selection of two distinct machine cycling times within the confines of three hundred and sixty degrees and seven hundred and twenty degrees. What is termed a short cycle of operation compounds the several shafts M-1 and M-2 on an X degree delay in rotational time basis for providing an overall main line M operation equal to three hundred and sixty degrees plus X degrees. In a like manner, what is termed a long cycle of operation compounds the several shafts M-1 and M-2 on a Y degree delay in rotational time basis for providing an overall main line M operation equal to three hundred and sixty degrees plus Y degrees. Which of such cycling times is selected depends upon the position, prior to machine operation, of the selecting stud 74 within its guide slots 16b and 17b, either downwardly for connecting the several clutch trip plates 70 and 80 one for operation with the other, or upwardly for disconnecting them. When so positioned downwardly which is normal for the stud 74 for purposes of the present disclosure, and which positioning will be assumed near the end of each machine cycle of operation initiated through the particular cycle initiating mechanism provided, machine operation of the short cycle type will be prescribed through indirect rocking of the clutch trip plate 80 under control of the actuating stud 73 during operation of the main line drive gear 45 (FIG. 3). As described above, the stud 73 is aligned for rocking the clutch trip plate 70 upon completion of X degrees rotation of the drive gear 45—hence like rotation of the associated main line right shaft M-1—and, through the selecting stud 74, imparts like rocking to the second clutch trip plate 80 for, at such designated time, starting rotation of the further main line drive gear 47 (FIG. 4)— hence likewise to the associated main line left shaft M-2. On the other hand, when the selecting stud 74 is positioned upwardly prior to machine operation through the cycle initiating mechanism provided, which, for purposes of the present disclosure, takes place upon actuation of the particular cycle selecting mechanism provided, long cycle machine operation will be prescribed through direct rocking of the clutch trip plate 80 under control of the further actuating stud 93 during rotation of the main line drive gear 45. As also described above (FIGS. 3 and 4), the stud 93 is aligned for so rocking the plate 80 upon completion of Y degrees of rotation of the drive gear 45 (like rotation of the associated right shaft M-1) for again, at such designated time, starting rotation of the further main line drive gear 47 (likewise of the associated main line left shaft M-2). With the trip plates disconnected one from the other at this time, stud 73 rocking of the plate 70 at the X degrees time period will not be transferred to the trip plate 80, and the plate 80 must thus rely on stud 93 rocking at the later Y degrees time period.

Although not described herein, an appropriate arrangement of mechanism is of course provided for braking the machine motor 20 upon completion of main line M operation in each instance. As illustrated in FIG. 1, such mechanism may be of the shaft 24 engaging friction type, or, if preferred, employ any one of the dynamic principles known for likewise effecting such motor braking control. Deenergization of the motor 20 of course occurs prior to the braking thereof. Again, while not illustrated, this consists of an appropriate arrangement of mechanism being provided for returning the motor control switch to its normal (open) condition at or near the end of the single cycle of rotation of the main line left shaft M-2.

Any number and shape of cams, gears, rocker arms, and the like may of course be carried by each of the main line shafts M-1 and M-2 for performing, at precise times, the various functional requirements of the machine in question. Companion cams, such as those illustrated in phantom and designated 110a and 110b in FIG. 2, may be provided on the respective shafts for, as an example, tripping associated mechanism under control of the right shaft M-1 and restoring said mechanism under control of the left shaft M-2, all permitted within the overall rotational operation of the machine main line M. Further examples are of course also apparent, including the provision of precisely arranged gear mechanism for rotating a unitary shaft (not illustrated) throughout the overall cycling time which may be selected for the machine main line M.

From the foregoing description of mechanism and operation of the instant invention, it should be readily understood that it is very flexible in nature and may be adapted to almost any type of machine having need for selection of either or both short and long cycles of operation of precisely calculated time periods. Thus, while the form of mechanism shown and described is admirably adapted to fulfill the objects stated, it is to be understood that the invention is susceptible of embodiment in various forms and is not intended to be confined beyond the limitations which may be imposed by the following claims.

What is claimed is:

1. In a cycle control mechanism for providing selection of needed-time single cycles of operation to machines of the class described, the combination of a split-shaft machine main operating line having independently rotatable first and second shaft portions; a clutch shaft; drive means for operating said clutch shaft through plural cycles of rotation; a first shaft portion single cycle of rotation drive member normally disconnected from operation with said clutch shaft; machine operation initiating means; means interconnecting said first shaft portion drive member for operation with said clutch shaft upon actuation of said machine operation initiating means; a second shaft portion single cycle of rotation drive member normally disconnected from operation with said clutch shaft; and means interconnecting said second shaft portion drive member for operation with said clutch shaft upon completion of a predetermined degree of the single cycle of rotation of said first shaft portion thereby; said first and second shaft portions combining in total rotation to provide an overall machine operation of a cycling time defined by compound operation of said machine main operating line equalling the single cycle of rotation of said first shaft portion thereof extended by the predetermined degree of delay in starting of the single cycle of rotation of said second shaft portion thereof.

2. The cycle control mechanism of claim 1 in which said second shaft portion drive member interconnecting means provides for drive member operation with said clutch shaft at both an X degrees period and a Y degrees period of completion of the single cycle of rotation of said first shaft portion thereby; and means actuatable prior to actuation of said machine operation initiating means is provided for selecting machine operation of a cycling time including one or the other of said X and Y degrees periods of drive member operation as the predetermined delay in starting of the second shaft portion of said machine main operating line with respect to the first shaft portion thereof.

3. The cycle control mechanism of claim 1 in which said first shaft portion drive member is rotatable on said clutch shaft; said interconnecting means therefor effects engagement of said drive member for single cycle rotation with said clutch shaft under control of actuation of said machine operation initiating means; transfer means is provided for transferring the single cycle rotation of said drive member to said first shaft portion; said second shaft portion drive member is rotatable on said clutch shaft; said interconnecting means therefor effects engagement of said second shaft portion drive member for single cycle rotation with said clutch shaft under control of rotation of said first shaft portion drive member therewith; and transfer means is provided for transferring the single cycle rotation of said second shaft portion drive member to said second shaft portion.

4. The cycle control mechanism of claim 1 in which said first shaft portion drive member is rotatable on said clutch shaft; clutch shaft engaging means is associated with said first shaft portion drive member and operated effective for engaging said drive member for rotation with said clutch shaft under control of actuation of said machine operation initiating means; said second shaft portion drive member is rotatable on said clutch shaft; clutch shaft engaging means is associated with said second shaft portion drive member; clutch trip means is associated with said second drive member engaging means and operable from a normally ineffective to an effective position for operating said engaging means effective for engaging said second shaft portion drive member for rotation with said clutch shaft; means is provided for operating said clutch trip means effective incident to X degrees completion of the single cycle of rotation of said first shaft portion by said clutch shaft; means is provided for operating said clutch trip means effective incident to Y degrees completion of the single cycle of rotation of said first shaft portion by said clutch shaft; and means is provided for selecting prior to actuation of said machine operation initiating means machine operation of a cycling time as prescribed by operation of said clutch trip means effective under control of one or the other of said X and Y degrees operating means.

5. The cycle control mechanism of claim 1 in which said first shaft portion drive member is rotatable on said clutch shaft; clutch shaft engaging means is associated with said first shaft portion drive member and operated effective for engaging said drive member for single cycle rotation with said clutch shaft under control of actuation of said machine operation initiating means; transfer means is provided for transferring the single cycle rotation of said drive member to said first shaft portion; said second shaft portion drive member is rotatable on said clutch shaft; clutch shaft engaging means is associated with said second shaft portion drive member; clutch trip means is associated with said clutch shaft engaging means and operable from a normally ineffective to an effective position for operating said engaging means effective for engaging said second shaft portion drive member for single cycle rotation with said clutch shaft; means is provided for operating said clutch trip means effective incident to X degrees completion of the single cycle of rotation of said first shaft portion drive member with said clutch shaft; means is provided for operating said clutch trip means effective incident to Y degrees completion of the single cycle of rotation of said first shaft portion drive member with said clutch shaft; means is provided for selecting prior to actuation of said machine operation initiating means operation of said clutch trip means effective under control of one or the other of said X and Y degrees operating means; and transfer means is provided for transferring the single cycle rotation of said second shaft portion drive member to said second shaft portion, whereby, according to said selecting means, said first and second shaft portions compound operation of said machine main operating line including either X degrees or Y degrees as the predetermined delay in starting of the second shaft portion thereof with respect to the first shaft portion thereof.

6. The cycle control mechanism of claim 3 in which said second shaft portion drive member interconnecting means comprises a clutch trip mechanism effective for engaging said second shaft portion drive member for single cycle rotation with said clutch shaft; means normally presenting said clutch trip mechanism at a drive member non-engaging position; short machine operation prescribing means operated with said first shaft portion drive member for overcoming said presenting means and transferring said clutch trip mechanism to a drive member engaging position upon completion of X degrees of the single cycle of rotation of said first shaft portion drive member with said clutch shaft; long machine operation prescribing means operated with said first shaft portion drive member for overcoming said presenting means and transferring said clutch trip mechanism to a drive member engaging position upon completion of Y degrees of the single cycle of rotation of said first shaft portion drive member with said clutch shaft; and means actuatable prior to actuation of said machine operation initiating means for preconditioning said clutch trip mechanism for transfer operation under control of one or the other of said short and long machine operation prescribing means.

7. In a cycle control mechanism for providing selection of needed-time single cycles of operation to machines of the class described, the combination of a machine main operating line having independently rotatable first and second shaft members; a clutch shaft; machine operation initiating means; drive means for operating said clutch shaft through plural cycles of rotation upon actuation of said machine operation initiating means; a first shaft member drive member rotatable on the said clutch shaft; means interconnecting said first shaft member drive member for single cycle rotation with said clutch shaft upon actuation of said machine operation initiating means; a second shaft member drive member rotatable on said clutch shaft; clutch trip means actuatable from a normally ineffective to an effective position for interconnecting said second shaft member drive member for single cycle rotation with said clutch shaft; means for actuating said clutch trip means effective upon completion of a predetermined degree of the single cycle of rotation of said first shaft member drive member with said clutch shaft; and transfer means for transferring to said first and second shaft members the time and extent of the single cycle rotations of the respective drive members, whereby a single cycle machine operation of an overall cycling time within the range of 360 degrees and 720 degrees in duration is provided through operation of said machine main operating line compounding the predetermined time-spaced single cycle rotations of said first and second shaft members thereof.

8. The cycle control mechanism of claim 7 in which said clutch trip means includes a first trip member; a second trip member; and said second trip member being effective upon operation for interconnecting said second shaft member drive member for single cycle rotation with said clutch shaft; means normally connecting said first and second trip members for operation one with the other; and said actuating means includes means operated with said first shaft member drive member for operating said first trip member at X degrees completion of the single cycle of rotation of said drive member with said clutch shaft, whereby the time-spaced single cycle rotations of said first and second shaft members thereunder provide an overall machine operation defined by compound operation of said machine main operating line equalling 360 degrees plus X degrees in cycling time.

9. The cycle control mechanism of claim 8 including machine cycle selecting means actuatable prior to actuation of said machine operation initiating means; means responsive to actuation of said machine cycle selecting means for disconnecting the said first and second trip members from operation one with the other; and said actuating means includes further means operated with said first shaft member drive member for operating directly said second trip member at a later, Y degrees completion of the single cycle of rotation of said first shaft member drive member with said clutch shaft, whereby the time-spaced single cycle rotations of said first and second shaft members thereunder provide an overall machine operation defined by compound operation of said machine main operating line equalling 360 degrees plus Y degrees in cycling time.

10. The cycle control mechanism of claim 8 in which said first trip member is rockably mounted adjacent said first shaft member drive member; said second trip member is rockably mounted adjacent said second shaft member drive member; said operated means comprises an abutment on said first shaft member drive member aligned for rocking said first trip member during rotation of said drive member; and said connecting means comprises a stud member engaged between said first and second trip members for effecting coincidental rocking of said second trip member.

11. The cycle control mechanism of claim 9 in which said first trip member is rockably mounted adjacent said first shaft member drive member; said second trip member is rockably mounted adjacent said second shaft member drive member; said operated means comprises an abutment precisely positioned on said first shaft member drive member and aligned for rocking said first trip member incident to said X degrees rotation of said drive member; said connecting means comprises a shiftably mounted stud member normally engaged between said trip members, where rocking of said first trip member is immediately transferred thereby to said second trip member; said disconnecting means effects shifting of said stud member from engagement between said trip members, where rocking of said first trip member is without transfer to said second trip member; and said further operated means comprises a further abutment precisely positioned on said first shaft member drive member and aligned for rocking said second trip member incident to said Y degrees rotation of said drive member.

12. The cycle control mechanism of claim 11 in which said trip member connecting stud member is carried by said disconnecting means; a stud member receiving notch in said first trip member; a companion stud member receiving notch in said second trip member; means normally positioning said disconnecting means for engaging said stud member within said receiving notches; and said machine cycle selecting means, when actuated, transferring said disconnecting means to a position effecting shifting of said stud member from engagement with at least one of said trip member receiving notches.

13. In a cycle control mechanism for providing machine operation of predetermined cycling times selected between 360 degrees and 720 degrees in duration, the combination of a machine main operating line having independently rotatable first and second shaft members; a clutch shaft; drive means for operating said clutch shaft through plural cycles of rotation; a first drive member associated for selective rotation with said clutch shaft; machine operation initiating means; means for interconnecting said first drive member for single cycle rotation with said clutch shaft upon actuation of said machine operation initiating means; means for transferring the single cycle rotation of said first drive member to said first shaft member; a second drive member associated for selective rotation with said clutch shaft; a first clutch trip member operably associated with said first drive member; a second clutch trip member operably associated with said second drive member; said second clutch trip member being effective when operated for interconnecting said second drive member for single cycle rotation with said clutch shaft; first means operated with said first drive member for operating said first clutch trip member upon completion of X degrees of the single cycle of rotation of said first drive member with said clutch shaft; trip member interconnecting means operable to positions of connecting and disconnecting said second clutch trip member with respect to said first clutch trip member, where first means operation of said first clutch trip member includes like operation of said second clutch trip member in the one instance and excludes operation of said second clutch trip member in the other instance; second means operated with said first drive member for operating said second clutch trip member upon completion of Y degrees of the single cycle of rotation of said first drive member with said clutch shaft; machine cycle selecting means actuatable prior to actuation of said machine operation initiating means of operating said trip member interconnecting means to one of said connecting and disconnecting positions thereof; and means for transferring the single cycle rotation of said second drive member to said second shaft member, whereby, according to actuation of said machine cycle selecting means, the said first and second shaft members unite in time-spaced single cycle rotations to provide an overall machine operation through compound operation of said machine main operating line equalling 360 degrees plus X degrees or 360 degrees plus Y degrees in cycling time.

14. The cycle control mechanism of claim 13 in which said trip member interconnecting means is normally at its position of connecting said second clutch trip member for operation with said first clutch trip member; and said machine cycle selecting means, when actuated, operates said interconnecting means from normal and to its position of disconnecting said second clutch trip member from operation with said first clutch trip member.

15. The cycle control mechanism of claim 13 in which said first drive member is a drive gear rotatable on said clutch shaft; said interconnecting means effects single cycle driving engagement of said drive gear with said clutch shaft; said transfer means therefor comprises an intermeshing companion gear affixed to said first shaft member; said second drive member is a drive gear rotatable on said clutch shaft; said second clutch trip member effects single cycle driving engagement of said drive gear with said clutch shaft; and said transfer means therefor comprises an intermeshing companion gear rotatable on said first shaft member, a companion gear affixed to said second shaft member, and intermeshing gear members between said rotatable and affixed companion gears.

16. The cycle control mechanism of claim 13 in which said first clutch trip member is positioned adjacent said first drive member; said second clutch trip member is positioned adjacent said second drive member; said first operated means comprises an abutment precisely positioned on said first drive member and of a length for operating engagement with said first clutch trip member during rotation of said drive member; and said second operated means comprises an additional abutment precisely positioned on said first drive member and of a length for operating engagement with said second clutch trip member during rotation of said drive member.

17. The cycle control mechanism of claim 16 in which said trip member interconnecting means comprises a stud member of a length to engage between said first and second clutch trip members; said stud member being mounted for shifting movement to and from connecting engagement between said clutch trip members; means normally urging said stud member to connecting engagement between said clutch trip members; and said machine cycle selecting means, when actuated, overcoming said urging means and transferring said stud member from connecting engagement between said clutch trip members.

18. In a cycle control mechanism for providing selection of short and long single cycle machine operations of predetermined cycling times between 360 degrees and 720 degrees in duration, the combination of a machine main operating line having independently rotatable first and second shaft portions; a clutch shaft; machine operation initiating means; drive means for operating said clutch shaft through plural cycles of rotation upon actuation of said machine operation initiating means; a first shaft portion single cycle of rotation drive member rotatable on said clutch shaft; means interconnecting said first shaft portion drive member for single cycle rotation with said clutch shaft upon actuation of said machine operation initiating means; a second shaft portion single cycle of rotation drive member rotatable on said clutch shaft; a selectively operable clutch trip plate adjacent said second shaft portion drive member; said clutch trip plate being effective when operated for interconnecting said second shaft portion drive member for single cycle rotation with said clutch shaft; a further selectively operable clutch trip plate adjacent said first shaft portion drive member; means normally connecting said clutch trip plate for operation with said further clutch trip plate; short machine operation prescribing means operated with said first shaft portion drive member for operating said further clutch trip plate at X degrees completion of the single cycle of rotation of said drive member with said clutch shaft; long machine operation prescribing means operated with said first shaft portion drive member for operating said clutch trip plate at Y degrees completion of the single cycle of rotation of said drive member with said clutch shaft; and machine cycle selecting means actuatable prior to actuation of said machine operation initiating means for disconnecting said clutch trip plate from operation with said further clutch trip plate, whereby, without actuation of said selecting means, the said first and second shaft portions combine in single cycle rotations to provide a short machine operation defined by compound operation of said machine main operating line equalling 360 degrees plus X degrees in cycling time, and whereby, with actuation of said selecting means, the said first and second shaft portions combine in single cycle rotations to provide a long machine operation defined by compound operation of said machine main operating line equalling 360 degrees plus Y degrees in cycling time.

19. The cycle control mechanism of claim 18 in which said first shaft portion drive member is a gear member; an intermeshing companion gear member affixed to said first shaft portion; said second shaft portion drive member is a gear member; a companion gear member affixed to said second shaft portion; and intermeshing transfer gear members between said second shaft portion gear and companion gear members.

20. The cycle control mechanism of claim 18 in which said trip plate connecting means comprises a stud member extending across said clutch and further clutch trip plates; a notch in said clutch trip plate; an aligned notch in said further clutch trip plate; said stud member being aligned and mounted for shifting movement to and from engagement with said clutch and further clutch trip plate notches; means normally positioning said stud member to engagement with said notches, where rocking of said further clutch trip plate effects coincidental rocking of said clutch trip plate; and said machine cycle selecting means, when actuated, overcoming said positioning means and shifting said stud member from engagement with said notches, where rocking of said further clutch trip plate effects no rocking of said clutch trip plate.

21. The cycle control mechanism of claim 18 in which said short machine operation prescribing means comprises an abutment on said first shaft portion drive member; said long machine operation prescribing means comprises a further abutment on said first shaft portion drive member precisely positioned behind said abutment thereon; said further clutch trip plate includes an operating nose portion aligned for engagement by said abutment during rotation of said first shaft portion drive member; and said clutch trip plate includes an operating nose portion aligned for engagement by said further abutment during rotation of said first shaft portion drive member.

References Cited
UNITED STATES PATENTS 2,399,890   5/1946   Pott ________________ 192—48

BENJAMIN W. WYCHE III, *Primary Examiner.*

L. J. PAYNE, *Assistant Examiner.*

UNITED STATES PATENT OFFICE
CERTIFICATE OF CORRECTION

Patent No. 3,384,211   May 21, 1968

Dale L. Placke et al.

It is certified that error appears in the above identified patent and that said Letters Patent are hereby corrected as shown below:

Column 1, line 68, cancel "sixty degrees single cycle of machine opera-"; line 68, after "and" insert -- twenty degrees. For purposes of the instant --. Column 9, line 6, after "main", first occurrence, insert -- line left shaft M-2 for rotational movement upon X degrees --; line 54, after "the" insert -- left --; same line 54, "shart" should read -- shaft --. Column 10, line 32, "is" should read -- its --.

Signed and sealed this 7th day of October 1969.

(SEAL)
Attest:

Edward M. Fletcher, Jr.          WILLIAM E. SCHUYLER, JR.
Attesting Officer                    Commissioner of Patents